United States Patent
Macek et al.

[15] 3,697,181
[45] Oct. 10, 1972

[54] RING LASER HAVING AMPLITUDE AND PHASE CONTROLLED CROSSED-BEAM ANTI-LOCKING FEEDBACK

[72] Inventors: Warren M. Macek, Huntington Station; Chao Chen Wang, Mineola, both of N.Y.

[73] Assignee: Sperry Rand Corporation

[22] Filed: March 14, 1967

[21] Appl. No.: 622,983

[52] U.S. Cl. ............356/106 LR, 331/94.5, 332/7.51
[51] Int. Cl. ................................................G01b 9/02
[58] Field of Search...88/14 I; 331/94.5; 356/106 LR

[56] References Cited

UNITED STATES PATENTS

| | | |
|---|---|---|
| 3,316,348 | 4/1967 | Hufangel et al....331/94.5 UX |
| 3,323,411 | 6/1967 | Killpatrick....................88/14 I |

*Primary Examiner*—Benjamin A. Borchelt
*Assistant Examiner*—N. Moskowitz
*Attorney*—S. C. Yeaton

[57] ABSTRACT

A ring laser provided with at least one mirror external to the ring cavity for reflecting energy from one of the two counterrotating laser beams back into the ring to couple to the other beam. The mirror is arranged to have varying reflectivity along one of its dimensions and is positioned along said dimension (to vary the amplitude of feedback) and in a direction perpendicular thereto (to vary the phase of feedback). Each of the counterrotating laser beams is extracted from the cavity and the amplitude modulation thereon (due to cross-beam coupling) is detected. If two external mirrors are used, each is positioned to eliminate the amplitude modulation on a respective extracted beam. If only one external mirror is used, it is positioned to make the amplitude modulation on one extracted beam equal in amplitude and opposite in phase to the amplitude modulation on the other extracted beam.

6 Claims, 6 Drawing Figures

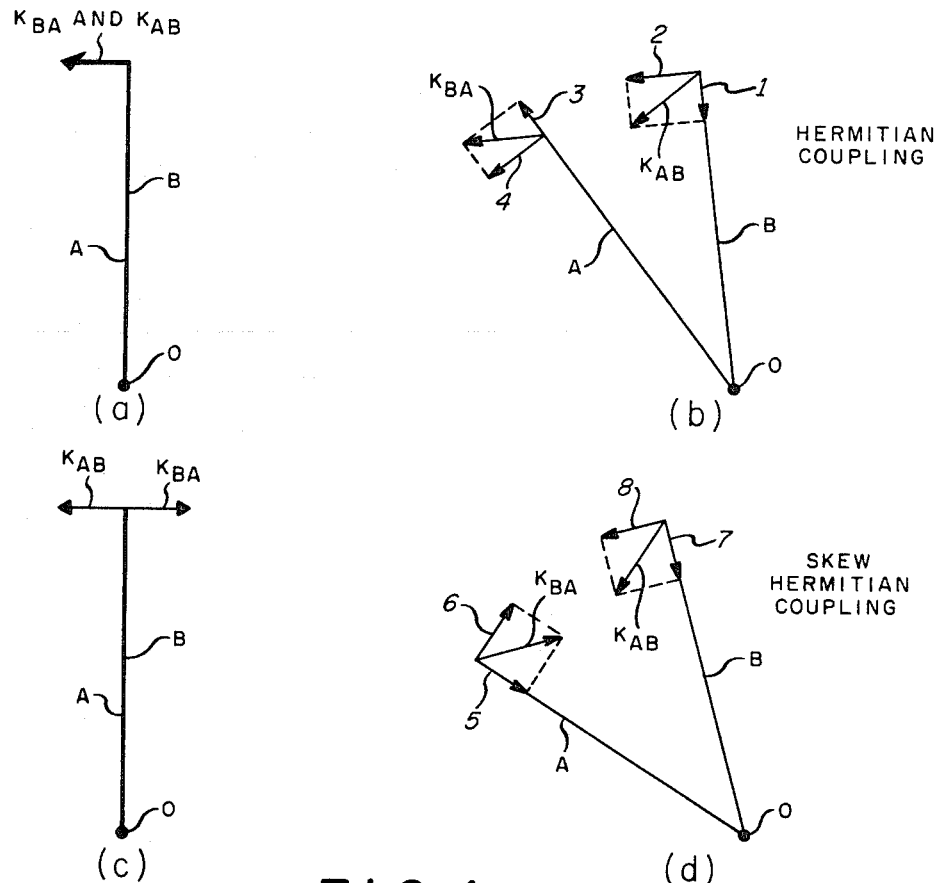
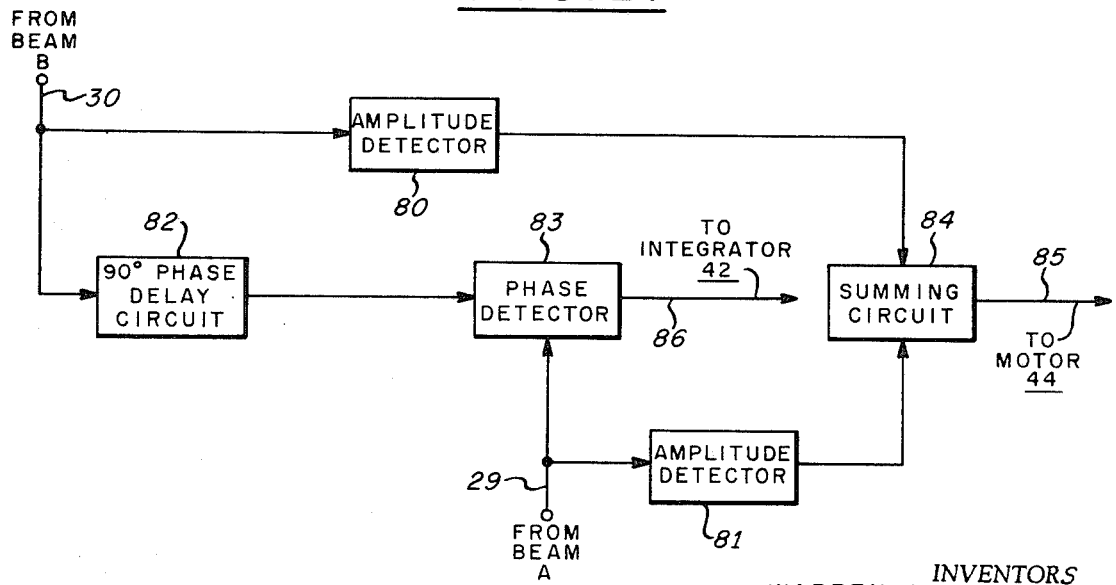
FIG. 1.
FIG. 5.

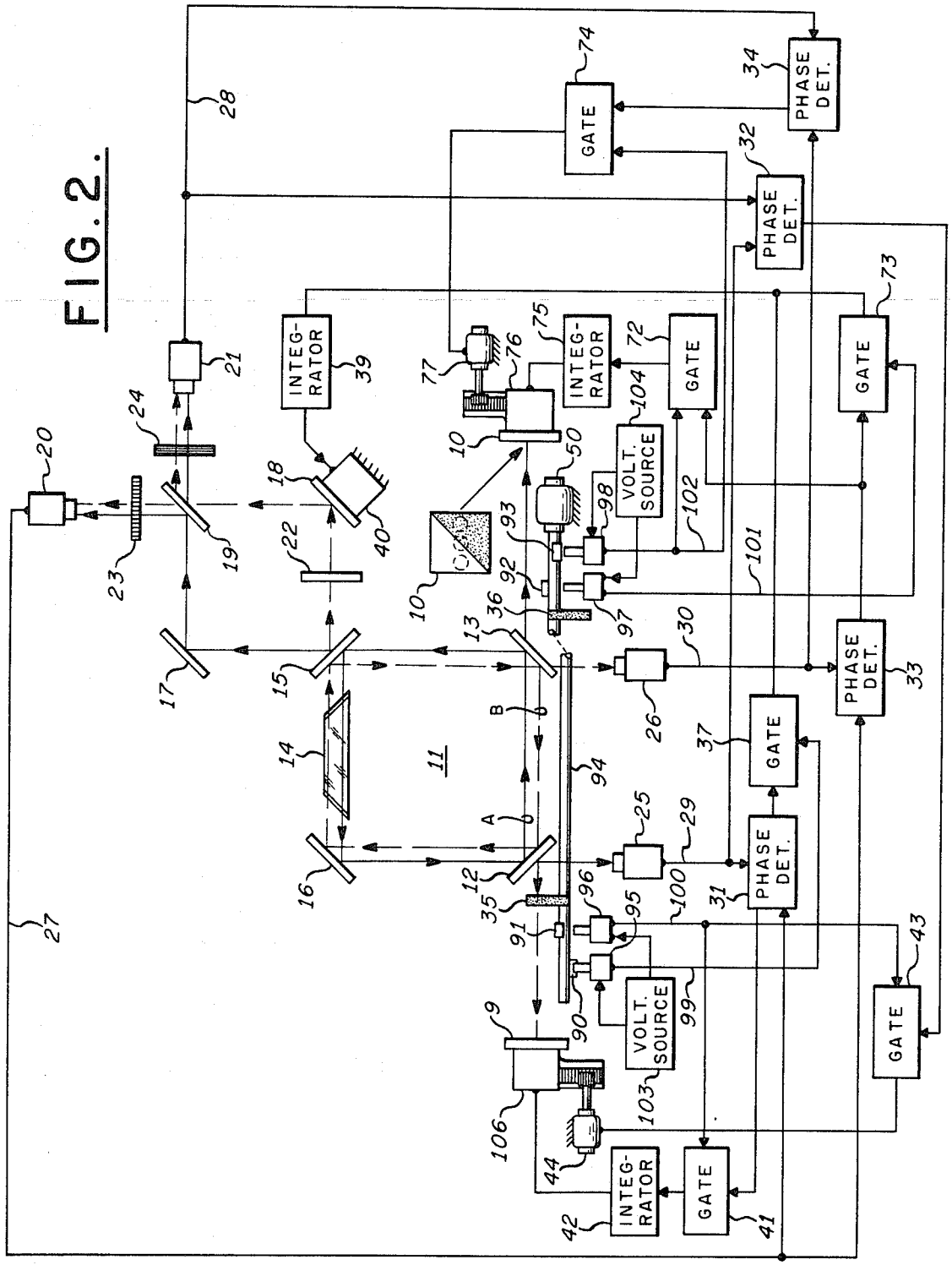

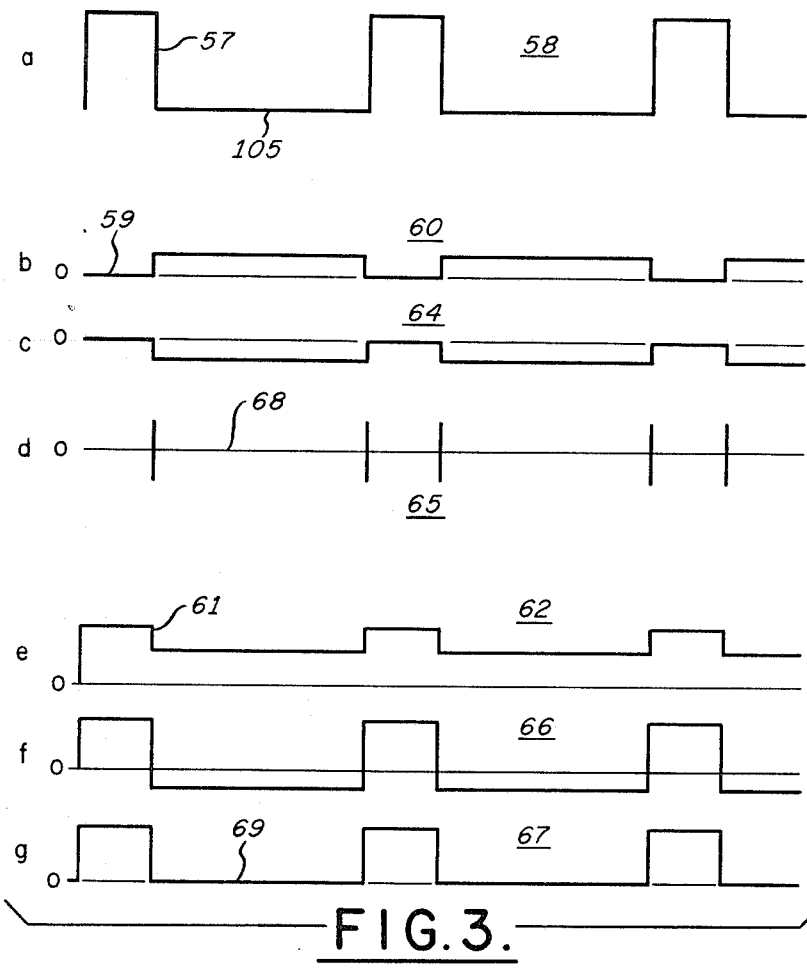
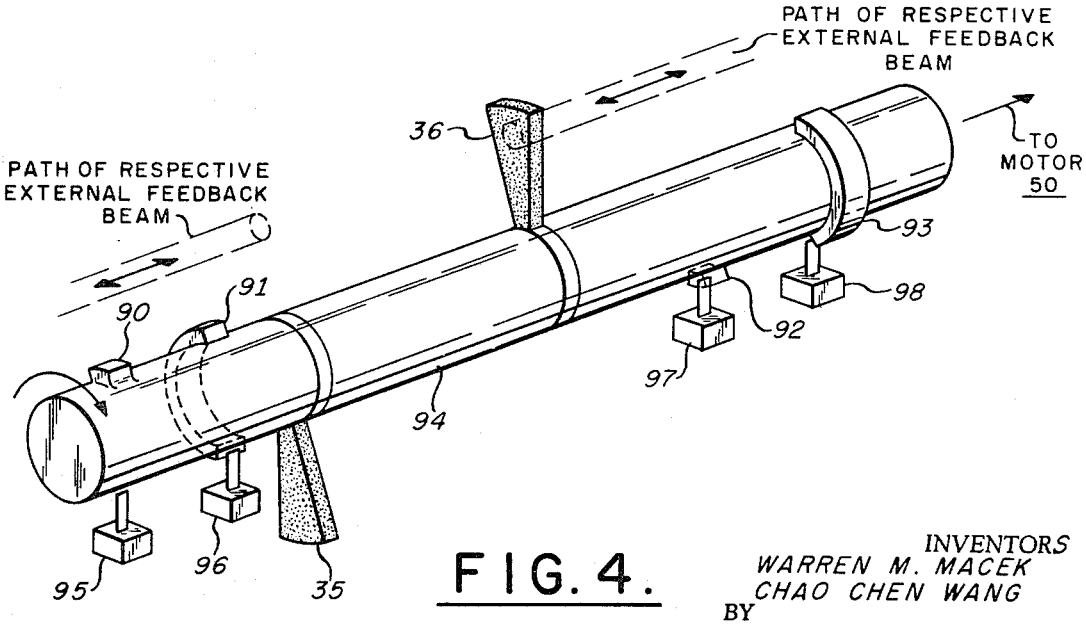

RING LASER HAVING AMPLITUDE AND PHASE CONTROLLED CROSSED-BEAM ANTI-LOCKING FEEDBACK

The invention herein described was made in the course of or under a contract or subcontract thereunder, with the Department of the Air Force.

BACKGROUND OF THE INVENTION

As is well understood, ring lasers are employed to sense rotation relative to an inertial frame of reference by detecting the beat note or frequency difference between the two counterrotating beams (two single beams which travel in opposite directions around the ring). The frequency difference is proportional to the rate of rotation; as the rate of rotation decreases, the beat note frequency decreases toward zero. However, when the frequencies of the two counterrotating beams approach each other closely, there is an increasing tendency toward mode locking to a common frequency. A certain critical value of coupling exists between the two counterrotating beams above which the frequencies of the two beams will pull toward the same frequency to produce a zero beat note. Such mode locking destroys the ability of the ring laser to sense very low rotation rates and distorts the relationship between beat note frequency and ring rotation rate as the mode locking point nears.

Several factors contribute to the coupling between the counterrotating beams and the resulting mode locking within the ring laser. For example, passive light scattering from optical surfaces in both the forward and backward directions and retro-reflection of transmitted light as well as non-linear effects within the active laser medium have been demonstrated to be effective in producing frequency locking. Unavoidable backscattering occurs from laser windows, corner reflectors, and combining optics and detectors. High quality polished surfaces and nearly perfect dielectric coatings on mirrors can not prevent a small amount of energy from one laser beam from being coupled or scattered in the direction of the oppositely travelling beam. Finite bore sizing of gas discharge tubes as well as apertures added to the ring to reduce transverse oscillating modes also contribute significantly to unwanted cross-coupling between the laser beams which produce a mode pulling instability and eventually a frequency locking effect.

Prior art attempts at solving the problem of mode locking have been directed at either avoiding or minimizing the problem without eliminating it. Mode locking can be avoided simply by introducing a predetermined frequency offset or bias between the two counterrotating beams in the ring laser. Such bias prevents the frequencies of the two beams from approaching each other closely enough to cause mode locking for a specified range of rotation rates which the laser is known to encounter in a given application. Alternatively, the problem of mode locking can be significantly reduced by simultaneously frequency modulating each of the counterrotating beams in a prescribed manner as set forth in copending patent application Ser. No. 597,761, filed on Nov. 29, 1966, now U.S. Pat. No. 3,462,708 in the name of Robert E. McClure and assigned to the present assignee.

SUMMARY OF THE INVENTION

It has been found theoretically that scattering forces within a ring laser which cause the mode locking of the counterrotating beams always can be resolved into Hermitian and skew Hermitian components. In general, for a given magnitude of scattering, skew Hermitian coupling is substantially more effective in producing mode locking than is Hermitian coupling. Apparatus is provided, in accordance with a first aspect of the present invention, for the elimination of both the Hermitian and the skew Hermitian components with a consequent elimination of mode pulling. The Hermitian and skew Hermitian components are eliminated by amplitude and phase controlled feedback from each of the counterrotating beams to the other so that the amplitude modulation on each of the counterrotating beams (due to cross-coupling between the beams) is reduced to zero. In a second aspect of the invention, solely the skew Hermitian component is eliminated with the aid of simpler apparatus to yield a very significant reduction in mode locking. The skew Hermitian component is eliminated by amplitude and phase controlled feedback from one of the counterrotating beams to the other so that the amplitude modulation on one of the counterrotating beams is made equal in amplitude and opposite in phase to the amplitude modulation on the other beam.

BRIEF DESCRIPTION OF THE DRAWINGS

FIG. 1 is a series of phasor diagrams representing the Hermitian and skew Hermitian components of the coupling force acting between the couterrotating beams of a ring laser;

FIG. 2 is a simplified diagram of a first species of the invention wherein both the Hermitian and skew Hermitian components of the coupling force are eliminated;

FIG. 3 is a series of waveforms helpful in understanding the embodiment of FIG. 2;

FIG. 4 is an enlarged view of some of the components shown in FIG. 2;

FIG. 5 is a simplified diagram of a second species of the invention wherein solely the skew Hermitian component of the coupling force is eliminated.

DESCRIPTION OF THE PREFERRED EMBODIMENTS

Figure 6:
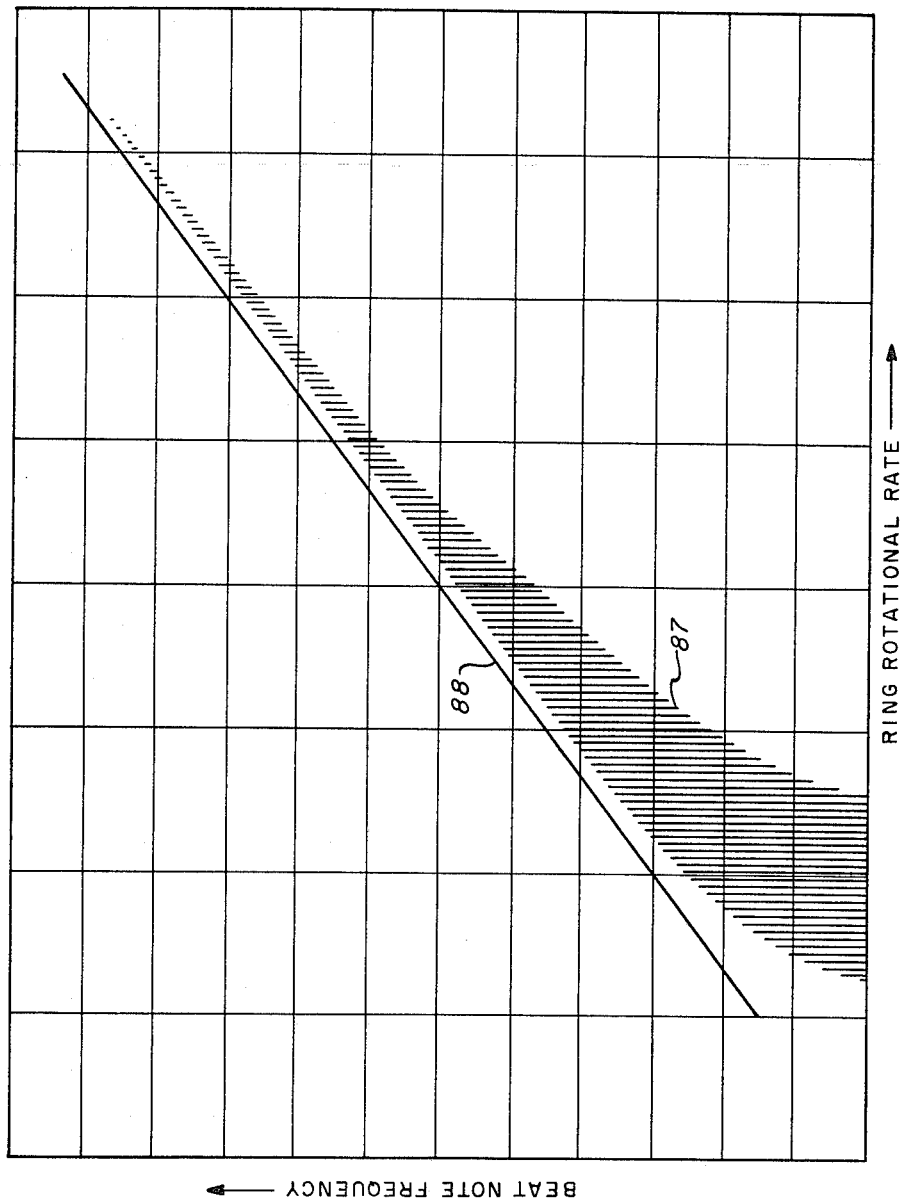
FIG. 6 is a plot depicting the mode locking characteristic of a typical ring laser with and without the benefit of the apparatus represented in FIG. 5.

It can be shown that the resultant scattering force acting within a ring laser can be resolved into Hermitian and skew Hermitian components. By definition, the coupling force acting on one of the laser beams (beam B) due to the other laser beam (beam A) can be represented by $-iK_{AB}A$ and the coupling force acting on beam A due to beam B can be represented by $-iK_{BA}B$. The factor $K_{AB}$, in turn, can be expressed as $$|K_{AB}|e^{-i<K_{AB}}$$

and the factor $K_{BA}$ can be expressed as $$|K_{BA}|e^{-i<K_{BA}}.$$

The coupling is Hermitian when $$<K_{AB} = -<K_{BA}.$$

The coupling is skew Hermitian when $< K_{AB} = \pi - < K_{BA}$. Typically, the coupling resulting from said force in a well designed ring laser is strongly Hermitian although some skew Hermitian coupling generally also is present. Skew Hermitian coupling is primarily responsible for mode locking between the counterrotating beams despite its ordinarily weaker magnitude relative to Hermitian coupling. Scattering from mirrors and windows, for example, normally gives rise to Hermitian coupling whereas losses in cavity mirrors cause skew Hermitian coupling. Hermitian coupling generally can supply only reactive energy but not real energy to the coupled beams. Skew Hermitian coupling, on the other hand, either consumes energy (if lossy) or produces energy (if an active medium) but will not store energy. Thus, skew Hermitian coupling adds or consumes real energy with respect to the coupled beams.

The distinctive characteristics of the Hermitian and the skew Hermitian coupling force are depicted in the phasor diagrams of FIG. 1. Phasors A and B of FIG. 1 represent respective counterrotating beams of the ring laser. If the ring laser is rotating about an axis normal to the plane of the ring, the frequency of the one beam increases while the frequency of the other beam decreases from the common nominal frequency value which obtains in the absence of ring rotation. The angular rotation rate of each phasor about origin O represents the frequency of the respective beam whereas the amplitude of each phasor represents the amplitude of the respective beam.

In the presence of Hermitian coupling between the laser beams, some energy from each beam couples into the other as represented by the vectors $K_{BA}$ and $K_{AB}$ of FIGS. 1a and b. $K_{BA}$ represents the energy from beam B which is coupled into beam A and $K_{AB}$ representing the energy from beam A which is coupled into beam B. The coupled component maintains a fixed phase relationship relative to the beam from which it derives its energy. For example, the coupled component $K_{BA}$ always maintains a fixed phase relationship relative to beam B because said component derives its energy from beam B. Similarly, the coupled component $K_{AB}$ maintains a fixed phase relationship relative to beam A. FIG. 1a represents the illustrative case wherein phasors A and B are of the same amplitude and momentarily of the same phase while coupling forces $K_{AB}$ and $K_{BA}$ also are of the same amplitude and momentarily of the same phase. Considering that the ring laser is rotating so that phasors A and B rotate in the same direction but at different angular rates about origin O, the phasors will assume the positions shown in FIG. 1b at a subsequent time. It should be noted that coupling force $K_{AB}$ maintains the same phase (angular) relationship with respect to phasor A as obtained in FIG. 1a. Similarly, coupling force $K_{BA}$ maintains the same phase relationship relative to phasor B as obtained in FIG. 1a. Coupling force $K_{AB}$ may be resolved into components 1 and 2 in the direction of and perpendicular to the direction of phasor B, respectively. Coupling force $K_{BA}$ may be resolved into components 3 and 4 in the direction of and perpendicular to the direction of phasor A, respectively. As is characteristic of Hermitian coupling, the components 1 and 3 of the coupling forces $K_{AB}$ and $K_{BA}$ simultaneously act in opposite directions upon the amplitudes of phasors B and A.

That is, the amplitude of phasor B is reduced by component 1 while the amplitude of phasor A is increased by component 3, i.e., the amplitude modulations on the phasors A and B are 180° out of phase. It should also be noted that the components 2 and 4 simultaneously change the angular rotation rates of phasors B and A in the same sense, i.e., either both phasors A and B are accelerated or decelerated in angular rate by components 4 and 2 whereby the frequency difference between phasors A and B is unaffected by components 4 and 2.

FIGS. 1c and 1d represent the skew Hermitian coupling force acting between beams A and B. FIG. 1c represents the illustrative case wherein phasors A and B have the same amplitude and momentarily the same phase whereas coupling forces $K_{BA}$ and $K_{AB}$ have the same amplitude and momentarily the opposite phase. In the presence of the same angular ring rotation as in the case of FIG. 1b, phasors A and B assume the positions shown in FIG. 1d at a moment subsequent to the time represented in FIG. 1c. It should again be noted that the phase of coupling force $K_{BA}$ relative to the phasor B and the phase of coupling force $K_{AB}$ relative to phasor A are the same in FIGS. 1(c) and FIG. 1d. Resolving the coupling forces $K_{BA}$ and $K_{AB}$ into their respective components 5, 6 and 7, 8, it can be seen that components 5 and 7 simultaneously act to decrease the amplitude of phasors A and B whereas components 6 and 8 oppositely affect the angular rotation rates of phasors A and B. The angular rotation rates of phasors A and B and, hence, the frequency difference therebetween continuously changes with time as phasors A and B rotate about origin O, at different rates due to rotation of the ring laser. Thus, frequency locking between the two counterrotating ring laser beams is much more probable in the presence of skew Hermitian coupling as compared to an equal magnitude of Hermitian coupling.

In accordance with the first species of the invention, mode locking between the counterrotating beams of a ring laser is eliminated by completely cancelling both the Hermitian and the skew Hermitian components of the coupling force acting between the beams. This is accomplished with the aid of the apparatus represented in FIG. 2 by reflecting back into the ring laser energy of proper phase and amplitude to cancel each coupling component $K_{AB}$ and $K_{BA}$ discussed in connection with FIG. 1. The required energy conveniently is obtained by the use of a pair of mirrors 9 and 10 located outside of the closed loop optical path of ring laser 11. Each of the mirrors 9 and 10 reflect a respective one of the counter-rotating beams which exits through the corresponding partially transmitting corner reflector 12 or 13. Each of the mirrors 9 and 10 are positioned by apparatus to be described along the direction of the impinging beam (so as to vary the phase of the reflected light) and along a second direction at right angles thereto (so as to vary the amplitude of the reflected light). The faces of the mirrors are partially covered by an anti-reflection coating so that the effective reflecting area encountered by the impinging beam (hence the amplitude of the reflected light) is varied by movement of the mirror along the aforesaid second direction.

Ring laser 11 is of conventional design and comprises an active lasing medium 14 and corner reflectors 12, 13, 15 and 16. Reflector 15, like reflectors 12 and 13, is partially transmitting to allow the counterrotating beams to emerge from the ring and be optically combined for the production of beat notes representing the frequency difference between the two and, hence, the rotation rate of laser 11. The beat notes are derived with the aid of conventional combining optics comprising reflectors 17 and 18, beamsplitter 19 and photocells 20 and 21. An electrical (beat) signal having a frequency equal to the desired beat note is provided by each of photocells 20 and 21.

In order to position mirrors 9 and 10 automatically, provision is made for placing the beat note form photocell 20 in phase quadrature with respect to the beat note from photocell 21. This is achieved through the use of quarter waveplate 22 and polarizers 23 and 24. Ring laser 11 produces a pair of linearly polarized counterrotating beams in a conventional manner. One of the beams (beam A) propagates in a counterclockwise direction whereas the other beam (beam B) propagates in a clockwise direction within the closed loop laser cavity. Beam A exits through partially transmitting mirror 15 and is redirected by mirror 17 and beamsplitter 19 to photocells 20 and 21. Polarizers 23 and 24 permit components of beam A to impinge on photocells 20 and 21 in the same time phase. Beam B passes through partially transmitting mirror 15 and is converted into a circularly polarized beam by quarter waveplate 22. The circularly polarized beam is redirected by mirror 18 and beamsplitter 19 to polarizers 23 and 24. The circularly polarized beam B comprises two linearly polarized components in time and space quadrature. Polarizer 23 passes the first component to photocell 20. The second component of circularly polarized beam B is attenuated by polarizer 23. Said second component is passed by polarizer 24 which blocks the first component. Inasmuch as the components of beam B are in time phase quadrature with respect to each other at photocells 20 and 21 and the components of beam A are in time phase with respect to each other at photocells 20 and 21, the beat note signal output from photocell 20 is in time phase quadrature with respect to the beat note signal output from photocell 21.

Each of beams A and B is amplitude modulated in the presence of internal feedback from the other beam which causes mode locking. The amplitude modulation on beam A (due to cross-coupling from beam B) is detected by photocell 25 whereas the amplitude modulation of beam B (due to cross-coupling from beam A) is detected by photocell 26. It will be observed that solely beam A passes through mirror 12 to photocell 25 and solely beam B passes through mirror 13 to photocell 26. The output signal from photocell 20 on line 27 and the output signal from photocell 21 on line 28 are used as reference signals against which the phases of the amplitude modulations on beam A (line 29) and on beam B (line 30) can be compared. The phase comparisons are made with the aid of phase detectors 31, 32, 33 and 34.

It is necessary to align the phases of the reference signals relative to the phase of the amplitude modulation on beam A prior to positioning mirror 9. Similarly, it is necessary to align the phases of the reference signals relative to the phase of the amplitude modulation on beam B prior to positioning mirror 10. The steps are taken in sequence under the control of cams 90, 91, 92 and 93 and shutters 35 and 36 on shaft 94 driven by motor 50. Cams 90, 91, 92 and 93 actuate switches 95, 96, 97 and 98, respectively, to produce gating signals in proper sequence on lines 99, 100, 101, and 102, respectively. Switches 95 and 96 receive excitation from source 103 whereas switches 97 and 98 receive excitation from source 104. In the first of the alignment steps, shaft 94 is angularly displaced so that shutter 35 blocks its respective feedback beam and cam 90 closes switch 95. At the same time, switches 96, 97 and 98 are open and shutter 36 does not block its respective feedback beam. Under the cited conditions, phase detector 31 provides an output signal to gate 37 representing the phase difference between the beat note on line 27 and the amplitude modulation signal on line 29. Normally non-conducting gate 37 is rendered conductive by the signal on line 99 and applies the phase error signal from detector 31 to piezoelectric crystal 40 via integrator 39. Crystal 40 serves to position mirror 18 in accordance with the integral of the phase error signal from phase detector 31 until the output of phase detector 31 is reduced to a null. In the null condition, the beat note signal on line 27 is in phase quadrature with respect to the amplitude modulation signal on line 29. Consequently, the beat note signal on line 28 is placed into an in phase relationship at phase detector 32 with respect to the amplitude modulation signal on line 29. This terminates the alignment mode of the apparatus represented in FIG. 2 prerequisite to the positioning of mirror 9.

In the positioning mode, shutter 35 is rotated to permit the establishment of the external feedback beam and mirror 9 is simultaneously positioned along two orthogonal directions to vary the amplitude and the phase of the external feedback beam so as to maintain the previously obtained null output from phase detector 31 and drive the output from phase detector 32 to a null. At the same time that shutter 35 is rotated to pass the feedback beam, cam 90 disengages switch 95 and cam 91 actuates switch 96 to produce a gating signal on line 100. Said gating signal renders normally non-conducting gate 41 conductive to establish a connection between phase detector 31 and integrator 42 which positions mirror 9 along the axis of the external feedback beam via piezoelectric crystal 106. Simultaneously, the gating signal on line 100 renders normally non-conducting gate 43 conductive to establish a connection between the output of phase detector 32 and motor 44 which drives mirror 9 in a direction transverse to the direction of the external feedback beam.

It will be recognized, of course, that the phase and the amplitude of the external feedback beam are entirely arbitrary at the moment that the beam is established by the rotation of shutter 35 out of the path of the external feedback beam. In order to completely cancel the internal feedback from beam B to beam A and thereby eliminate its contribution to mode locking between the counterrotating beams within the ring laser, it is necessary that the external feedback be made equal in magnitude and 180° out of phase with respect to the internal feedback from beam B to beam A. If the external feedback was not in 180° phase relationship with the internal feedback, then the null which was achieved at the output of phase detector 31 during the alignment mode will be disturbed. A signal of appropriate polarity at the output of phase detector 31 signifies the direction in which the external feedback signal departs from the desired 180° phase relationship with respect to the internal feedback signal. The resulting phase error signal is applied via conducting gate 41 and integrator 42 to piezoelectric crystal 106 which positions mirror 9 to vary the phase of the external feedback beam so as to restore the null at the output of phase detector 31. At the same time, the amplitude of the external feedback signal is varied by the output signal from phase detector 32 which drives motor 44 via conducting gate 43 in a direction to minimize the amplitude of the signal on line 29 representing the net feedback from beam B to beam A resulting from both the internal and the external feedback.

The above described operation can be better understood by referring to the waveforms of FIG. 3. The gating signal 58, appearing on line 99 of FIG. 2, comprises a pedestal portion 57 having a duration coinciding with the alignment mode and a base portion 105 coinciding with the positioning mode related to the adjustment of mirror 9. At the end of the alignment mode, there is no output from phase detector 31 (portion 59 of wave form 60, FIG. 3b) but there is a maximum output from phase detector 32 (portion 61 of waveform 62, FIG. 3e). If the arbitrary position of mirror 9 is other than the correct one for complete cancellation of the amplitude modulation on beam A as represented by the amplitude of the signal on line 29, one of the waveforms 60 and 64 of FIG. 3b and FIG. 3c will appear at the output of phase detector 31 and one of the waveforms 62 and 66 of FIG. 3e and FIG. 3f will be produced at the output of phase detector 32. If the arbitrary position of mirror 9 happens to be the correct one for complete cancellation of the signal on line 29, waveform 65 of FIG. 3d is produced at the output of phase detector 31 and waveform 67 of FIG. 3g is produced at the output of phase detector 32. It should be noted that portions 68 and 69 of waveforms 65 and 67 are at a null (zero amplitude) when mirror 9 has been correctly positioned to completely cancel the signal on line 29.

Fully equivalent apparatus is provided for the positioning of mirror 10 so as to provide external feedback of proper amplitude and phase to completely eliminate the amplitude modulation on beam B due to internal feedback from beam A whereby the amplitude of the signal on line 30 is reduced to a null. The apparatus for this purpose comprises voltage source 104, switches 97 and 98, gates 72, 73 and 74, shutter 36, integrators 39 and 75, phase detectors 33 and 34, piezoelectric crystal 76 and motor 77. First, the signal on line 27 at the output of photocell 20 is placed in phase quadrature with the signal on line 30 at the output of photocell 26 during the time that shaft 94 has rotated to the position whereby shutter 36 blocks its respective external feedback beam and cam 92 actuates switch 97 to produce a gating signal on line 101. Normally non-conducting gate 73 is rendered conductive by the gating signal. Phase detector 33 provides an output signal which is applied via conducting gate 73 and integrator 39 to piezoelectric crystal 40, thereby positioning mirror 18 to bring the signal on line 27 into the desired phase quadrature relationship with the signal on line 30.

Upon the completion of the alignment mode, shutter 36 is rotated out of the path of the respective external feedback signal, and cam 93 actuates switch 98 to produce a gating signal on line 102. The gating signal renders conductive the normally non-conducting gates 72 and 74. If the arbitrary phase and amplitude of the external feedback signal from beam A to beam B are not correct, signals of appropriate polarity are produced at the outputs of phase detectors 33 and 34 so as to position mirror 10 long the direction of the external feedback signal and in a direction perpendicular thereto, respectively, to reduce the output signals from phase detectors 33 and 34 to nulls in the same manner as described in the case of mirror 9.

The manner in which the gating signals are generated in proper sequence can be better understood by reference to FIG. 4. FIG. 4 shows on an enlarged scale the cam, switch and shutter components of FIG. 2. Corresponding elements are similarly numbered. Assuming, the sake of exemplification that shaft 94 is rotating in the indicated clockwise direction and momentarily is at the angular displacement shown, shutter 36 blocks its respective external feedback beam while cam 92 actuates switch 97. This corresponds to the time of the alignment mode related to the adjustment of mirror 10. Upon the incremental angular displacement of shaft 94 sufficient to disengage cam 92 and switch 97, switch 98 becomes actuated by cam 93 and shutter 36 rotates out of the path of its respective external feedback beam allowing said beam to become established. Mirror 10 is positioned during the interval that cam 93 continues to actuate switch 98. At the completion of said interval, cam 93 disengages switch 98 and switch 95 becomes actuated by cam 90, initiating the alignment mode related to the positioning of mirror 9. Said alignment mode persists until cam 90 disengages switch 95 and switch 96 becomes actuated by cam 91. The actual positioning of mirror 9 is completed during the time that cam 91 continues to engage switch 96. A new cycle of operation commences when switch 96 is disengaged by cam 91 and cam 97 again becomes actuated by cam 92.

It should be noted that shaft 94 preferably is one continuous shaft as shown in FIG. 4. The slight parallel displacement of the two portions of shaft 94 shown in FIG. 2 are the result of the parallel displacement of the counterrotating beams A and B to facilitate distinguishing one beam from the other in the drawing. It is to be understood that there is no actual displacement between the axes of propagation of beams A and B either inside or outside the ring laser nor is there necessarily any displacement between different portions of shaft 94.

A substantial reduction in the amount of apparatus required for minimization of the mode locking force acting between beams A and B is achieved in a second species of the invention by the technique of making the signals on lines 29 and 30 of FIG. 2 of equal amplitude and opposite phase rather than by eliminating said signals. Said technique causes the coupling acting between beams A and B to become purely Hermitian as discussed in connection with he vector diagrams of FIGS. 1a and 1b. As previously pointed out, the total elimination of the skew Hermitian component of the coupling force acting between beam A and beam B does not totally eliminate mode locking but it does effect a very substantial reduction therein. In accordance with the theory of the present invention, a single external feedback mirror (either mirror 9 or mirror 10) is positioned along the direction of the respective external feedback path and in a direction perpendicular thereto so as to introduce a skew Hermitian component in the cross coupling between beams A and B equal in amplitude but opposite in phase to the skew Hermitian component already present due to the internal feedback between the beams. The desired result it achieved through the use of the relatively simple structure represented in FIG. 5 comprising amplitude detectors 80 and 81, 90° phase delay circuit 82, phase detector 83 and summing circuit 84. In terms of FIG. 2, the apparatus of FIG. 5 replaces phase detectors 31, 32, 33 and 34, gates 41, 43, 37, 72, 73, 43, and 74, shaft 94 and all of its associated elements, integrator 39, piezoelectric crystal 40, integrator 75, mirror 10, piezoelectric crystal 76, motor 77 and obviates the need for the reference signals on lines 27 and 28. Line 29 of FIG. 2 is connected to one input of phase detector 83 and to amplitude detector 81 of FIG. 4 whereas line 30 of FIG. 2 is connected to 90° phase delay circuit 82 and amplitude detector 80 of FIG. 4. The output of circuit 82 is connected to the second input of phase detector 83. The outputs of amplitude detectors 80 and 81 are connected to summing circuit 84. The output of circuit 84 of FIG. 4 is connected to motor 44 of FIG. 2 and the output of phase detector 83 of FIG. 4 is connected to integrator 42 of FIG. 2.

In operation, the signal on line 29 (representing the amplitude modulation on beam A due to internal feedback from beam B) is rectified into a signal of one polarity by amplitude detector 81 while the signal on line 30 (representing the amplitude modulation of beam B due to internal feedback from beam A) is rectified into a signal of the opposite polarity by amplitude detector 80. The detected signals are applied to summing circuit 84 which provides an output signal on line 85 representing the amplitude difference between the signals on lines 29 and 30. Said amplitude difference is related to the extent to which the coupling between beams A and B is not purely Hermitian assuming that the signals on lines 29 and 30 are of opposite phase. The amplitude error signal on line 85 is applied to motor 44 to vary the amplitude of the external feedback signal in the proper direction and amount to cause the output of circuit 84 to fall to a null. The phase of the external feedback signal is controlled by the output signal on line 86 which is applied to integrator 42 to vary the position of mirror 9 along the direction of the respective external feedback signal. The signals on lines 85 and 86 are driven to nulls only when the signals on lines 29 and 30 are of equal amplitude and opposite phase which is the unique condition for the total elimination of any skew Hermitian component which may be present due to the internal feedback between beams A and B within the ring laser.

The very considerable improvement effected by the relatively simple apparatus of FIG. 4 is reflected in the data plotted in FIG. 6. Said data was obtained with a conventional ring laser operating with and without the external feedback afforded by a single external mirror, such as mirror 9 of FIG. 2. The abscissa of the plot of FIG. 6 is related to the rotational rate of the ring laser about an axis perpendicular to the plane of the ring. The ordinate of the plot is related to the frequency of the beat note produced by heterodyning the counterrotating beams of the ring laser in a conventional manner. The data of shaded curve 87 of FIG. 6 was taken in the absence of any external feedback and clearly shows that the frequency of the beat note varies for a given rotation rate of the ring laser and that the amount of frequency variation increases as the ring rotational rate decreases, i.e., the range of ordinate values for a given abscissa value increases as the abscissa value decreases. The frequency variations of the beat note in the absence of external feedback are attributable to the random phase variations of the internal feedback acting between two counterrotating beams within the ring laser.

Merely by the provision of an external mirror, such as mirror 9 in FIG. 2, which is properly positioned so as to vary the amplitude and phase of the external feedback to make the signals on lines 29 and 30 of FIG. 2 equal in amplitude but opposite in phase, the performance depicted in curve 88 is achieved. It should be noted in the presence of external feedback of proper amplitude and phase, the objectionable frequency variation of the beat note at a given angular rotational rate of the laser is substantially eliminated. Moreover, the relationship between beat note frequency and ring rotational rate is substantially linearized relative to the relationship obtaining in the absence of external feedback as depicted by curve 87. Additionally, external feedback of proper amplitude and phase permits the generation of a useful beat note signal whose frequency is accurately representative of ring rotational rates to much lower values of rotational rates than is possible in the absence of external feedback.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. A ring laser producing two counterrotating laser beams,
    said laser beams being extracted and made available along respective paths outside the ring cavity of said laser,
    said extracted beams being amplitude modulated due to cross-coupling between said laser beams inside said cavity,
    first means located outside said cavity along one of said paths for redirecting energy from one of said extracted beams back into said cavity in the direction of the other of said beams so that energy from said one beam is coupled to said other beam inside said cavity,
    null-seeking control means for controlling said first means to vary the redirected energy, and
    second means located along another of said paths for detecting the amplitude modulation on the other of said extracted beams and producing an output signal in response thereto,
    said output signal being applied to said control means to vary said redirected energy.

2. A ring laser as defined in claim 1 wherein said null-seeking control means varies the amplitude of the redirected energy.

3. A ring laser as defined in claim 1 wherein said null-seeking control means varies the phase of the redirected energy.

4. A ring laser as defined in claim 1 wherein said null-seeking control means varies the amplitude and the phase of the redirected energy.

5. A ring laser as defined in claim 1 wherein said output signal is applied to said control means to vary said redirected energy so that said amplitude modulation is reduced to a minimum.

6. A ring laser as defined in claim 1 and further including third means located along another of said paths for detecting the amplitude modulation on said one of said extracted beams and producing an output signal in response thereto, both said output signals from said second and third means being applied to said control means to vary said redirected energy so that the amplitude modulation on one of said beams is made equal in amplitude and opposite in phase to the amplitude modulation of the other of said laser beams.

* * * * *